United States Patent [19]

Schröder et al.

[11] 4,443,569

[45] * Apr. 17, 1984

[54] PROCESS FOR THE PRODUCTION OF THERMOSETTING AQUEOUS ELECTROCOATING COMPOSITIONS SUSCEPTIBLE OF BEING CATHODICALLY DEPOSITED AND THE USE THEREOF

[75] Inventors: Manfred Schröder, Herdecke; Arty R. T. Subramanyam, Wuppertal, both of Fed. Rep. of Germany

[73] Assignee: Lackwerke Wülfing GmbH & Co., Wuppertal, Fed. Rep. of Germany

[*] Notice: The portion of the term of this patent subsequent to Mar. 15, 2000 has been disclaimed.

[21] Appl. No.: 366,522

[22] Filed: Apr. 8, 1982

Related U.S. Application Data

[63] Continuation-in-part of Ser. No. 250,639, Apr. 3, 1981, Pat. No. 4,376,848.

[30] Foreign Application Priority Data

Dec. 22, 1981 [EP] European Pat. Off. ........ 81110669.9

[51] Int. Cl.³ .................... C08G 71/04; C08L 74/04; C09D 5/40
[52] U.S. Cl. ................ 523/414; 204/181 C; 428/457; 428/460; 523/404; 524/901; 524/510; 524/512
[58] Field of Search ...................... 524/901, 510, 512; 523/414; 428/457, 460

[56] References Cited

U.S. PATENT DOCUMENTS

| 3,799,854 | 3/1974 | Jerabek ............................ 204/181 C |
| 3,947,338 | 3/1976 | Jerabek et al. .................. 204/181 C |
| 3,984,299 | 10/1976 | Jerabek ............................ 204/181 C |
| 4,033,917 | 7/1977 | Sekmakas et al. .............. 204/181 C |
| 4,036,800 | 7/1977 | Sekmakas et al. .............. 204/181 C |
| 4,310,646 | 1/1982 | Kempter et al. ..................... 524/901 |
| 4,376,848 | 3/1983 | Subramanyam et al. ........... 524/901 |

FOREIGN PATENT DOCUMENTS

| 12463 | 6/1980 | European Pat. Off. . |
| 39425 | 11/1981 | European Pat. Off. . |
| 2002756 | 7/1971 | Fed. Rep. of Germany . |
| 2252536 | 8/1973 | Fed. Rep. of Germany . |
| 1546840 | 5/1975 | Fed. Rep. of Germany . |
| 2541234 | 4/1976 | Fed. Rep. of Germany . |
| 2457437 | 6/1976 | Fed. Rep. of Germany . |
| 2620612 | 12/1976 | Fed. Rep. of Germany . |
| 2541801 | 3/1977 | Fed. Rep. of Germany . |
| 2814439 | 5/1980 | Fed. Rep. of Germany . |
| 3014290 | 10/1981 | Fed. Rep. of Germany . |

OTHER PUBLICATIONS

Ford Engineering Material Specification EU–3948, Jan. 1973, sheets 1–13.
Farbe and Lack 87(2) 1981, pp. 94–99.

*Primary Examiner*—Ronald W. Griffin
*Attorney, Agent, or Firm*—Merriam, Marshall & Bicknell

[57] ABSTRACT

The invention relates to thermosetting, cathodically depositable, aqueous electrocoating compositions which are produced by reacting a nitrogen base-containing binder, which contains tertiary amino groups and primary and/or secondary OH groups, with metal compounds, which are sparingly soluble or insoluble in water, of cobalt, copper, lead, nickel and/or manganese at temperatures between 100° C. and 150° C. under an inert gas. The resultant products are subsequently protonated with an acid and diluted with water in a manner known per se to yield electrocoating paints having a solids content of from 5 to 25% and pH values of 5 to 8. Octoates, naphthenates, borates, and also acetyl acetonates are preferred to be used as the metal compounds which are sparingly soluble or insoluble in water.

15 Claims, No Drawings

PROCESS FOR THE PRODUCTION OF THERMOSETTING AQUEOUS ELECTROCOATING COMPOSITIONS SUSCEPTIBLE OF BEING CATHODICALLY DEPOSITED AND THE USE THEREOF

This application is a continuation-in-part of our earlier patent application Ser. No. 250,639, filed Apr. 3, 1981, now U.S. Pat. No. 4,376,848.

The present invention relates to a process for producing thermosetting aqueous coating compositions which are susceptible of being cathodically deposited and comprise nitrogen base-containing binders, and to the preferred use thereof for the cathodic so-called electrophoretic paint deposition (electrodeposition, electrocoating) on articles made of metals, and especially those made of iron metals.

Cathodic electrodeposition has recently gained an increasing importance besides anodic electrodeposition. The main reasons hereof are to be seen in the significant improvements in the corrosion protection properties obtained thereby as possessed by the coatings on iron substrates, particularly by those coatings having a relatively low thickness of from 10 to 20 μm. The best anodic coatings fail to give satisfactory results under the same conditions, even in the case of a proper pretreatment such as iron-phosphatizing, mixed iron/calcium-phosphatizing, and zinc-phosphatizing, and even in the case that each procedure is followed by a final rinsing with chromic acid.

As a matter of fact, it just occurs in the case of iron substrates which have been subjected to said pre-treatments and have additionally been rinsed with a chromium (VI) or chromium (III) solution, that the paint films having been cathodically deposited and thermally cured show such high corrosion protection values that, for example, the times of exposure in the salt spray test (ASTM B 117-64) can be increased to about two to three times the values employed with the anodic coatings. It is contemplated that, besides other reasons, this is due to two essential differences between a cathodic and an anodic electrophoretic paint deposition. On the one hand, the carrier resins of the paint compositions for cathodic electrocoating are predominantly nitrogen base-containing binders, contrary to the carboxyl group-containing binders as contained in the paint compositions for anodic electrocoating, and said nitrogen base-containing binders, like many amine-containing compounds or polymers, display a corrosion-inhibiting effect. On the other hand, a reduction or release of hydrogen, respectively takes place as the primary step of the electrolysis on the metallic substrate, which has appropriately been connected to be the cathode, in the case of the cathodic electrophoretic paint deposition, while an oxidation or release of oxygen, respectively, occurs on the substrate that has been connected to be the anode. This is why, theoretically, no metal ions can be released from the substrate by oxidation in the cathodic deposition process, as will be the case from the substrate wired to be the anode in the anodic deposition process. Consequently, many times the substrate metal ion concentration is found in the paint films having been formed by anodic deposition, as compared to that found in those paint films obtained by cathodic deposition.

Nitrogen base-containing binders or carrier resins, respectively, such as those having so far been used in the compositions for cationic electrophoretic paint deposition, as well as processes for producing said binders have been described in many publications. These known carrier resins are mostly nitrogen base-containing binders, which have the properties of being internally or externally cross-linkable and condensable, and will, therefore, evolve the most various kinds of condensation or decomposition products in the step of thermally curing the deposited paint films. In this context there may be mentioned the German Published Examined Patent Application (AS) No. 15 46 840, the German Published Unexamined Patent Applications (OS) Nos. 20 02 756, 22 52 536, 25 14 801, 26 20 612, and 30 14 290, the U.S. Pat. Nos. 3,799,854, 3,947,338, 3,984,299, 4,033,917, and 4,036,800, and our U.S. Pat. No. 4,376,848 corresponding to the European Patent Publication No. 00 39 425. The disclosure of these publications and patents is specifically incorporated herein by reference.

Most of the compositions for cationic electrophoretic paint deposition, which are derived from said known binders, still present some serious deficiencies. For example, a considerable portion of decomposition products is formed when the deposited wet paint films are baked at article temperatures of 180° C.±20° C. Weight losses of from 15 to 20 percent, relative to deposited coatings having been desolvatized at 105° C. for 1 hour, were determined upon baking the paint films at from 160° C. to 200° C. (cf., e.g., D. Saatweber, Automobilindustrie 1/79, pp. 71–76). This relatively high portion of decomposition products, namely water, formaldehyde, $C_1$ to $C_8$ alcohols or amines, reduces the paint film yield, and, moreover, pollutes the environment by the respective emission of the baking ovens.

Moreover, there has been found that such cationic electrocoating compositions for the paint coating of automotive bodies may involve serious problems in the multi-layer paint film structure as to the adhesion of the layers if the primer, upon deposition, has not sufficiently been cured. For the time being, baking conditions of at least 20 minutes at a circulating air temperature of 180° C. are required in order to accomplish optimal curing of the dry films having the desired thicknesses of 15 to 20 μm.

Another significant drawback inherent to the cathodic coatings has been constituted by the fact that the anticorrosive effects thereof at a dry film thickness ranging from 5 to 20 μm on degreased or oiled steel sheets have so far failed to meet the high requirement standards of the automotive industry. Since, in the electrocoating of automotive bodies or of small components and spare parts, the degreasing pre-treatment and phosphatization do sometimes fail to reach all of the internal surfaces or of those cavities and parts which are difficultly accessible, respectively, there has for a long time been desired that the cationic coating compositions be capable of wetting well said areas, and that the cured paint films have satisfactory anticorrosive properties. While the cationic electrocoating compositions having so far been known will substantially provide the good throwing power required, said compositions only meet the requirements for thermally cured paint films as to oiled iron surfaces and the respective adhesive property and anticorrosion values to a very low extent, and in some cases they do not at all.

Some time ago, there was attempted to improve corrosion control as effected by cathodic coatings on untreated steel by adding lead-containing pigments and/or specific metal compounds to the respective coating composition systems capable of being internally or externally cross-linked. For example, the German OS No. 24 57 437 describes the additional use of water-soluble salts of the metals cobalt, nickel, cadmium, tin, antimony, zinc or copper, and the German AS. No. 28 14 439 describes the addition of a water-soluble lead compound, and, more specifically, of a lead salt of an organic carboxylic acid.

Other publications mainly describe the use in cationic electrocoating compositions of water-insoluble metal compounds which initiate specific reactions. However, while inorganic and organic metal compounds have only been mentioned as known curing catalysts for polyisocyanate-containing binders in the specification of the German OS No. 25 41 234, according to the European Patent Publication No. 00 12 463 water-insoluble salts or complexes of a great variety of metals, especially those of lead, are suitable to be used as transesterification catalysts for curing of the two-components binder systems in a finished paint having mainly been claimed.

Two substantial disadvantages are inherent to all of these known cationic electrocoating compositions which contain salts or complexes of heavy metals or alkaline earth metals. In the case that water-soluble metal salts, such as copper acetate or lead acetate, are contained in the paint, these salts with the relevant metal concentrations cause an increase in the electrical conductivity values and, at the same time, a decrease in the pH values of the paint. As, besides, the film resistance of the deposited paint film is also lowered, the throwing power of the electrocoating paint is eventually reduced. Moreover, in the course of the ultrafiltration operation as conventionally employed to-day in electrocoating procedures, the water-soluble metal salts will pass through the membranes with about the same concentration, in which they are present in the coating composition. On the contrary, in the case that water-insoluble metals salts, such as, for example, the octoates, naphthenates, or acetylacetonates, are contained in the coating composition, said compounds also pass through the membranes in the ultrafiltration step, in part due to their low molecular weights and an improved solubility imparted by the solvents present in the electrocoating composition, but in part in the form of their water-soluble salts formed by respective saponification. In both cases, the ultrafiltrates contain considerable amounts of metals salts which are detrimental to the environment, so that these metal salts have to be precipitated by means of coagulation/flocculation systems prior to introducing the ultrafiltrate into the industrial waste waters. The filtered sludges are then stored as special waste materials in especially licensed waste disposal areas.

Today, however, part of the ultrafiltrate is used for rinsing the automotive bodies or parts thereof when they emerge from the bath, and is recycled to the electrocoating tank (in a so-called "closed loop system"), so that regulation and control of the metal concentration in the coating composition and, consequently, in the paint film being deposited are very difficult. This will be clearly evident from the consideration that today, in the case of lead-containing cationic electrocoating compositions, lead(II) concentrations of 200 to 400 ppm are found in the ultrafiltrate, and lead(II) concentrations of about 0.2 ppm (0.2 mg/l) are found in industrial waste water after the precipitation of lead and filtration (cf., e.g. Farbe+Lack 87, (2) 1981, p. 98).

It is one object of the present invention to provide aqueous electrocoating compositions, which are susceptible of being cathodically deposited, the use of which, on the one hand, results in an improvement of the adhesion of the cathodic coatings especially on non-phosphatized steel panels which, in part, also contain drawing oils, while, consequently and at the same time, protection from corrosion is significantly improved. It is another object of the present invention to eliminate or, at least, substantially reduce the problems relating to the emissions of decomposition products formed in the baking step and of metal salts via the ultrafiltrate, which are encountered when the cathodically depositable electrocoating compositions having so far been known are used.

These problems are solved by both a process for the production of thermosetting, cathodically depositable aqueous electrocoating compositions which have been improved to this end, and the preferred use thereof for coating conductive metallic articles which predominantly contain iron.

This process according to the invention is characterized in that a nitrogen base-containing binder comprising tertiary amino groups and primary and/or secondary OH groups is reacted with metal compounds of cobalt, copper, lead, nickel and/or manganese, which are sparingly soluble or insoluble in water, at temperatures between 100° C. and 150° C. under an inert gas, followed by protonation with an acid and dilution with water in a manner known per se.

In the process according to the invention, the octoates, naphthenates, borates and/or acetonyl-acetonates of said metals are preferred as the metal compounds being sparingly soluble or insoluble in water, i.e. these compounds may be used alone or in mixtures.

These metal compounds are used in amounts of metal contents of from 0.05 to 5% by weight, preferably from 0.1 to 2% by weight, based on 100% of the nitrogen base-containing binder.

In the process according to the invention, use is made of those nitrogen base-containing binders the amine values of which range between 40 and 400, and preferably between 60 and 200. Among the nitrogen base-containing binders having tertiary amino groups, those having been described in greater detail in the aforementioned European Patent Publication No. 00 39 425 are particularly suitable.

The reaction of the nitrogen base-containing binders with the metal compounds is carried out at temperatures between 100° C. and 150° C. under an inert gas, as has been mentioned above. At these temperatures, the binder, depending on its viscosity, is present as a 100% resin or in the form of a solution in solvents, such as, for example, glycol ethers, alcohols or mixtures thereof. The metal compounds are preferably used as solutions in suitable solvents. The periods of treatment required will range from 1 hour up to a maximum of 4 hours at said temperatures, depending upon the amounts of the metal compounds used, with proper homogenization by means of a stirrer or similar dispersing/homogenization devices.

The nitrogen base-containing binders having been reacted, according to the invention, with the metal compounds in the presence of heat, or the solutions thereof, are relatively stable at temperatures up to 50° C. They may either be directly used in the further process to yield the electrocoating compositions susceptible of being cathodically deposited, or they may be stored in a suitable manner without substantially impairing the properties of the electrocoating compositions according to the invention to be later prepared therefrom.

Subsequent to the reaction described above of the nitrogen base-containing binders in the presence of heat with at least one metal compound necessary for the particular optimum use of the coating composition, the products are converted into the ready-to-use aqueous electrocoating compositions susceptible of being cathodically deposited by protonation with an acid and dilution with water in a manner known per se. More specifically, the procedure to recover the ready-to-use electrocoating compositions may be as follows:

In order to achieve, in the case of pigmented coating compositions, for example, an optimum wetting of the pigment or filler surface, the smaller portion of the nitrogen base-containing binder as required for grinding or dispersing is neutralized with an acid to a percentage as high as possible of its amine equivalent. Said percentage may be as high as 100%, if a suitable organic acid, such as, for example, formic acid, acetic acid and/or lactic acid, is used, but it should amount to 60 to 80%, if possible. Since, however, the total degree of neutralization of the nitrogen base-containing binder in the ready-to-use coating composition is between 10 and 60%, preferably between 20 and 40%, the so-called let down-binder is neutralized to a correspondingly lower extent of the amine equivalent. In these materials, the respective degrees of neutralization are in the range of from 10 to 40%, and preferably between 20 and 30%.

In view of the fact that the nitrogen base-containing binder having been treated according to the invention with suitable metal compounds may be used as a pigment paste-ground resin, as a let down resin, or in both of the paint precursor products, it is possible to decisively influence the total metal content of the ready-to-use coating composition and, thus, the overall properties of the paint films obtained therefrom by cathodic deposition and thermal curing.

The thermosetting, cathodically depositable, aqueous electrocoating compositions obtained in accordance of the present invention entail significant improvements and advantages over those of prior art in many respects.

Above all, it is surprising that, in the process according to the invention, nitrogen base-containing binders, which will otherwise only be cured by external cross-linking and which contain primary and/or secondary OH groups together with tertiary amino groups, yield aqueous coating compositions which unambiguously exhibit cross-linking film properties when baked at article temperatures above 150° C. subsequent to cathodic deposition. Secondary and/or primary amino and/or acid amide groups may also be present in the nitrogen base-containing binders in addition to the abovementioned groups.

Moreover, the thermally cured paint films obtained from the electrocoating compositions according to the invention exhibit definitely improved adhesion properties and anticorrosive effects when present in dry film thicknesses of 5 to 20 μm, especially on non-phosphatized iron metals, even if these metals were poorly degreased.

Further partially heat-reactive resin components, such as, for example, phenolic and/or amino resins, may also be admixed with the electrocoating compositions which have been prepared according to the invention and comprise nitrogen base-containing binders having been reacted with the metal compounds according to the invention. In the form of pigmented coating compositions, they additionally contain the suitable pigments and fillers which are usually used with aqueous electrocoating compositions, as well as the dispersants and/or wetting agents which may be necessary to ensure the optimum properties of the coating composition and paint film. On the other hand, the use of pigments containing lead, strontium, and chromate, which pigments are conventionally used in the known coating compositions, may completely be dispensed with in the thermosetting, cathodically despositable, aqueous electrocoating compositions according to the invention.

Eventually, there may be mentioned, as further, however essential advantages over the prior art coating compositions, those properties, relating to the vent air and waste water emissions, of the electrocoating compositions prepared according to the invention. As to the emissions caused by baking the cathodic metal coating compositions, this means a significant reduction in both carbonaceous decomposition products and water, and in combination therewith, substantially lower fresh air and energy inputs required for the baking ovens and combustion units. For example, the coating films obtained by cathodic deposition from the previously known electrocoating compositions, after having been desolvatized at 105° C. for 1 hour, will still evolve about 15 to 20% by weight of decomposition products during the subsequent curing step which may take from less than 20 minutes at an object temperature of 170° C. up to 30 minutes at an object temperature of 200° C., whereas the comparative data obtained with the electrocoating compositions according to the invention are about 5 to 10% by weight, depending on whether alone an externally cross-linking resin or internally/externally cross-linking resin components were used in the coating composition.

The emission problems relating to the waste waters of cathodic electrocoating units are known to be considerable in the case of the previously known and commercially used electrocoating compositions which are susceptible of being cathodically deposited. This is due to the fact that the waste water of an electrocoating plant is composed of the paint drag-out, the ultrafiltrate to be discharged, and the rinsing water used for a final rinsing with fully demineralized water, so that these waste waters are altogether and jointly to be subjected to a special water-conditioning process. In such processes, in addition to the precipitation of lower molecular weight portions of the resins, the flocculation of heavy metal compounds is of particular importance, especially of those compounds containing lead, copper or other metal which are harmful to the environment, all the more since an approximately quantitative precipitation of the metals depends, in a direct proportionality, on the concentrations thereof and on the amounts used of precipitant and/or flocculant. In contrast thereto, the metal-containing electrocoating compositions prepared in accordance with the present invention do, surprisingly, contain significantly less metal ions, or, in most cases, even no metal ions at all dissolved in their aqueous phase, which fact results in that the respective ultrafiltrates of said paints do not contain any or, at most, contain substantially less metal salts than is the case with the previously known electrocoating compositions susceptible of being cathodically deposited. Thus, substantially lower amounts of precipitants and flocculants are required in the treatment of waste waters effluent from the electrocoating units in which the electrocoating compositions prepared according to the invention are used.

When the thermosetting, cathodically depositable, aqueous electrocoating compositions prepared according to the invention are used, the cathodic coating voltages are in the range of from 50 to 500 V, and, for obtaining optimum paint film thicknesses of 10 to 20 μm, generally in the range of from 100 to 400 V.

The thermosetting, cathodically depositable aqueous electrocoating compositions prepared according to the invention are used in the form of paints upon dilution with water to a solids content of from 5 to 25% by weight. The diluted paints have pH values in the range between 5 and 8, and preferably of 6 to 7.

Thermal curing of the paint films having been cathodically deposited from the electrocoating compositions according to the invention is conveniently effected at temperatures of 150° C. to 200° C., preferably at 160° C. to 180° C., based on the temperatures of the articles, with baking periods of from 60 to 10 minutes.

The invention is further illustrated, though not limited, by the following examples in which "parts" are understood to mean parts by weight and all percentages are by weight.

EXAMPLES

First, comparative tests were carried out with clear paints, i.e. non-pigmented paints, comprising a thermally non-curing, externally crosslinking, nitrogen base-containing binder. Said tests were scheduled in order to determine to which extent a nitrogen base-containing binder having been treated according to the invention and electrocoating compositions prepared therefrom do exhibit film-crosslinking properties when the coatings are subjected to thermal curing. Another object of the tests was to determine the emissions of baking by measuring the weight loss thereof as compared to that obtained with coatings having been desolvatized at 105° C. for 1 hour.

The resin as described in greater detail in Examples I/II-1 of the European Patent Publication EP No. 0 039 425 (corresponds to U.S. Pat. No. 4,376,848) was used as the externally cross-linking, nitrogen base-containing binder having tertiary amino groups.

A. Preparation of the Resin

In a four-neck flash equipped with a stirrer, thermometer, reflux condenser, and dropping funnel, 224 g (2.2 moles) of dimethyl aminopropylamine are heated to 130° C. under an inert gas (nitrogen). 1,400 g of a 75% xylene solution of an epoxide resin having an epoxy equivalent weight of 525 (product DER 671 of Dow Chemical) are dropwise added within 2 to 3 hours while stirring. The reaction mixture is maintained at 130° C. until an epoxide value of zero is reached. The excess amine and xylene are then distilled off under vacuum. 52 g (0.4 moles) of allyl glycidyl ether are dropwise added at 150° C. within half an hour, and the mixture, while being stirred, is allowed to react at 150° C. for another hour, followed by adjusting the solids content of the adduct resin to 70% by weight with ethyl glycol.

572 g of the above 70% adduct resin are heated in a four-neck flask to 130° C. under an inert gas (nitrogen). Then, a mixture of 80 g of ethyl hexyl acrylate and 20 g of hydroxypropyl methacrylate as well as 2 g of di-t-butyl peroxide are dropwise added within 2 hours while stirring, and the mixture is maintained at 130° C. for further 3 hours while stirring.

A copolymer having a solids content of about 74% (Resin A) is obtained. The viscosity of a 50% solution in ethyl glycol at 20° C. is 1,360 mm$^2$/s. The amine value of the solid resin is 120. After partial neutralization (25% of the amine value) with a 10% acetic acid, the resin is unlimitedly water-dilutable, and the pH of a 10% solution thereof is 6.5. Employing a cell for electrocoating, a deposit is obtained at 150 V on a steel sheet wired as the cathode, which deposit, however, is not thermally curable up to 180° C. and is readily "bitten" or partially dissolved by solvents.

In the tests according to the invention, the resin having been dissolved in ethyl glycol was stirred with various metal compounds and mixtures thereof at 130° C. for 2 hours under a nitrogen atmosphere. Steel sheets were cathodically coated at 150 V with 10% electrocoating compositions, which had been prepared therefrom by neutralization (25% of the amine value) with a 10% acetic acid and subsequent dilution with water in the same way as in the case of the metal-free clear paint compositions, and the coatings were thermally cured.

For comparison, the test results are summarized in Table 1, in which the baking temperatures are also enlisted.

In order to determine the degree of completion of curing and cross-linking of the deposited and baked paint films having a dry film thickness of 20 μm, a pad of cotton wool having been soaked with methyl ethyl ketone was moved to and fro on the film. In this test, the number of cycles required to soften the film due to biting (partial dissolution) is proportional to the film cross-linking (degree of cross-linking).

TABLE 1

| Test No. | Metal Compound | % Metal, Based On 100% Binder | Loss In Baking, % By Weight | | Degree of Cross-Linking After Baking For 30 min At 180° C. |
|---|---|---|---|---|---|
| | | | 30 min/180° C. | 30 min/200° C. | Number of Cycles |
| 1 | — | — | 9 | 11 | — |
| 2 | Co Borate (18%) | 0.3 | 7 | 9.7 | 102 |
| 3 | Pb Octoate (18%) | 2 | 7.6 | 10.2 | 60 |
| 4 | Cu Naphthenate (8%) | 0.5 | 7.2 | 10.0 | 71 |
| 5 | { Co Borate  Cu Naphthenate } | { 0.3  0.5 } | 6.8 | 9.4 | 125 |

The following properties of coating compositions containing a black pigment were tested in order to very clearly demonstrate the advance in the art achieved with the electrocoating compositions according to the invention:

(1) The anticorrosive properties of relatively thin paint films having thicknesses of 10±5 μm on zinc-phosphatized steel sheets rinsed with chromic acids (a), a well degreased steel sheets (b), and on oiled steel sheets (c).

The throwing power test method EU BI 20-2C according to FORD was used in the tests. For these tests, two metal sheets of 30×10.5 cm each were bonded to each other to form a box for determining the throwing power. For the procedure of coating the sheets used to determine the throwing power, that deposition voltage, depending on the type of metal substrate, was chosen which yielded approximately comparable coating heights (in cm, measured from the lower edge of the panel) on all of the inner surfaces and comparable paint film thicknesses at different distances (also measured from the lower edge of the panel) of the throwing power panels.

After curing in a circulating air oven at 180° C. for 20 minutes, the coated throwing power-sheets were subjected to the action of a salt mist for 240 hours according to ASTM B 117-64, in order to subsequently determine the corrosion limits of the coatings.

(2) The vent air emission behavior of the coatings having been cured in a circulating air oven at 180° C. for 30 minutes and at 200° C. for 30 minutes.

The relative baking emission, based on a dry film thickness of about 18 to 20 μm was determined by desolvatizing the wet coatings at 105° C. for 1 hour prior to subsequent thermal curing. The relative loss occuring in baking (in percent by weight of the uncured desolvatized film) was then determined by re-weighing the samples.

(3) The ultrafiltrate emission behavior of the electrocoating compositions, which contain heavy metals and are susceptible of being deposited on a cathode, depending on the type of metal compound(s) and the manner of incoporating same into the composition.

According to the Claims and Examples of the German OS No. 24 57 437, the German AS No. 28 14 439, and the European Patent Publication EP No. 0 012 463, the same metals were incorporated into the black electrocoating composition in the same concentrations (percent by weight of metal, based on 100% nitrogen base-containing binder) in comparison with the metal-containing compounds incorporated in accordance with the invention. After stirring at room temperature for a period of 72 hours, the coating compositions were subjected to ultrafiltration by means of a DÜRR-ABCOR unit (membrane type HFM 163). The ultrafiltrates were quantitatively analyzed for their metal content.

More specifically, the procedure was as follows:

The externally cross-linking resin described above under (a) was again used as the nitrogen base-containing binder in all tests, from which resin there had initially been prepared a pigment paste for all of the experiments.

B. Preparation of the Pigment Paste (Black)

100 parts of the 74% copolymer Resin A, after having been neutralized to 80% of its amine equivalent with 10% acetic acid, were diluted to a solids content of 20% with distilled water, then pre-dispersed by means of an impeller together with 370 parts of a pigment-filler mixture consisting of
  300 parts of $BaSO_4$,
  20 parts of carbon black, and
  50 parts of $TiO_2$ (rutile type),
and thereafter finely dispersed in a bead mill. The resultant aqueous pigment paste having a solid contents of about 60% had a pH of 5.4.

Comparative Tests 6 Through 9

For use in all of the four tests, 674 parts of the undiluted Resin A were thoroughly mixed with 300 parts of a phenolic resol having been etherified will allyl alcohol in the phenolic OH groups (Methylon 75108 of General Electric) by means of an impeller at 40° C. for 30 minutes, followed by neutralization to 25% of the amine equivalent with 10% acetic acid and subsequent thorough homogenization together with the pigment paste B by means of the impeller for 1 hour to form a paint concentrate having a pigment/binder ratio of 0.26:1.

For the comparative tests 6 and 7, the compositions were slowly diluted with distilled water and adjusted to have a paint solids content of 16%. Then, aqueous lead acetate solution (test 6) was admixed by stirring according to the German AS No. 28 14 439, and aqueous copper acetate solution (test 7) was admixed by stirring according to the German OS No. 24 57 437.

For the comparative test 8, the lead octoate solution was incorporated by dispersion at 40° C. according to the European Patent Publication EP No. 0 012 463 prior to the dilution with distilled water.

Eventually, comparative test 9 was run as a blank test without any metal compound.

Having been aged for 72 hours, the composition baths having 16% solids contents were analyzed for their pH and conductivities, and then the throwing powers thereof were determined according to the FORD specification EU BI20-2C on zinc-phosphatized sheets rinsed with chromic acid (a), on well degreased steel sheets (b), and on oiled steel sheets (c).

The weight losses occuring during baking at 180° C. and 200° C., respectively, for 30 minutes each were determined for steel sheets having been coated with 300 V.

The metal concentrations of the ultrafiltrates corresponding to the compositions 6 through 9 were quantitatively determined.

The results of the comparative tests are set forth in Table 2.

Tests 10 Through 12 According to the Invention

The metal-containing binders of resin A, having been modified according to the invention, which binders have been described in the tests 2 through 5 and the results reported in Table 1, were thoroughly homogenized together with the heat-reactive phenolic resin, neutralized to 25% of the amine equivalent, and subsequently again homogenized with the black pigment paste B, as has been described in comparative tests 6 through 9, to form a paint concentrate having a pigment/binder ratio of 0.26:1. The electrocoating compositions 10 through 12, obtained by adjusting the concentrates to solids contents of 16% with distilled water, were tested as described for the comparative tests 6 through 9. The results are also set forth in Table 2.

TABLE 2

| Test No. | Metal Compd. (% Metal Content In The Solution) | Wt. % Metal, Based On 100% N—Base-Contg. Binder | Paint Parameters at 25° C. | | FORD Throwing Power, ASTM B 117-64 Sheet | | | Loss In Baking For 30 min | | Metal In Ultrafiltrate ppm |
|---|---|---|---|---|---|---|---|---|---|---|
| | | | pH | Conductivity $\mu S\ cm^{-1}$ | a | b | c | 180° C. Wt. % | 200° C. Wt. % | |
| 6 | Pb Acetate/H$_2$O (4.4% Pb) | 2 | 6.0 | 1,500 | 12 | 8 | 4 | 8.0 | 10.0 | 730 |
| 7 | Cu Acetate/H$_2$O (3% Cu) | 0.5 | 6.3 | 1,250 | 11 | 6 | 4 | 7.9 | 10.1 | 30 |
| 8 | Pb Octoate/ White Spirit (18% Pb) | 2.0 | 6.3 | 1,300 | 14 | 9 | 5 | 8.2 | 10.2 | 690 |
| 9 | — | — | 6.5 | 1,200 | 11 | 6 | 2 | 8.2 | 10.2 | — |
| 10 | Pb Octoate/ White Spirit (18% Pb) | 2 | 6.4 | 1,250 | 17 | 12 | 8 | 7.0 | 9.3 | 150 |
| 10 | Cu Naphthenate/ White Spirit (8% Cu) | 0.5 | 6.4 | 1,200 | 16 | 10 | 6 | 6.8 | 9.0 | ≦5 |
| 11 | { Cu Naphthenate/ White Spirit (8% Cu) | 0.5 | 6.4 | 1,210 | 18 | 13 | 10 | 6.5 | 8.6 | ≦5 |
| | Co Borate/White Spirit (18% Co) } | 0.3 | | | | | | | | ≦10 |

What is claimed is:

1. A process for the production of a thermosetting cathodically depositable aqueous composition for electrocoating comprising
    (A) reacting under an inert gas a nitrogen base-containing binder having tertiary amino groups and primary, secondary or mixed primary and secondary OH groups with one or more sparingly water soluble to water insoluble cobalt, copper, lead, nickel, or manganese compounds at an elevated temperature to form a reaction product;
    (B) protonating the reaction product with an acid; and
    (C) diluting the product with water after said acid protonating step.

2. A process according to claim 1 in which the reaction is effected at a temperature of about 100° C. to 150° C.

3. A process according to claim 1 in which the cobalt, copper, lead, nickel or manganese compounds are octoates, naphthenates, borates or acetylacetonates.

4. A process according to claim 1 or 3 in which about 0.05 to 5% by weight of metal compound, calculated as metal, is used based on 100% nitrogen base-containing binder.

5. A process according to claim 4 in which about 0.1 to 2% by weight of metal compound, calculated as metal, is used based on 100% nitrogen base-containing binder.

6. A process according to claim 1 in which the nitrogen base-containing binder used in the reaction has an amine value of about 40 to 400 and the acid protonating effects a degree of neutralization of about 10 to 60%.

7. A process according to claim 6 in which the neutralization is brought to about 20 to 40% based on the amine value.

8. A process according to claim 1 including adding to the reaction product a heat reactive phenolic resin, an amino resin or a heat reactive phenolic resin and an amino resin.

9. A process according to claim 1 in which, following dilution, the product has a solid contents of about 5 to 25% by weight and a pH of about 5 to 8.

10. A process according to claim 9 in which the pH is about 6 to 7.

11. A process according to claim 1 or 8 including adding a pigment to the reaction mixture before or after dilution with water to produce a product having about 5 to 25% solids by weight and a pH of about 5 to 8.

12. A thermosetting cathodically depositable aqueous composition for electrocoating metal surfaces comprising the product of step (c) of any of claims 1 to 3.

13. A composition according to claim 12 additionally comprising a heat reactive phenolic resin, an amino resin or a heat reactive phenolic resin and an amino resin.

14. A metal coated with a thermosetting cathodically applied paint containing a composition comprising the product of step (c) of any of claims 1 to 3.

15. A metal coated with a thermosetting cathodically applied paint containing a composition comprising the product of step (c) of any of claims 1 to 3 and a heat reactive phenolic resin, an amino resin or a heat reactive phenolic resin and an amino resin.

* * * * *